3,454,681
AMIDO PHOSPHORUS-CONTAINING ESTERS
Hugo Malz and Günther Hermann, Leverkusen, Germany, assignors to Farbenfabriken Bayer Aktiengesellschaft, Leverkusen, Germany, a corporation of Germany
No Drawing. Filed Feb. 4, 1966, Ser. No. 525,145
Claims priority, application Germany, Feb. 22, 1965,
F 45,318
Int. Cl. A01n 9/36; C07f 9/24, 9/02
U.S. Cl. 260—944                9 Claims The present invention relates to particular new phosphorus-containing esters having rodenticidal properties, to their compositions with carrier vehicles, and to new methods for the production and use thereof.

It has been found in accordance with the present invention that the particular new phosphorus-containing esters having the general formula:

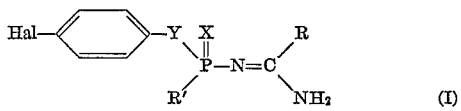
(I)

in which R represents a member selected from the group consisting of hydrogen and lower alkyl, R' represents a member selected from the group consisting of lower alkyl and lower alkoxy, X and Y each respectively represents a member selected from the group consisting of oxygen and sulfur, and Hal represents a halo atom, possess valuable pesticidal, and especially rodenticidal, properties.

It has been previously ascertained and therefore is already known that O,O - diaryl - phosphoric and -thiophosphoric acid ester halides react with amidines to form the corresponding amidido esters of the formula:

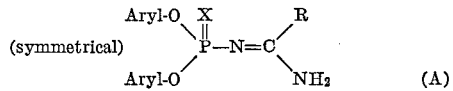
(A)

wherein R and X are the same as defined above. However, the compounds of Formula A having two different O-aryl ester radicals, as well as those of the present invention as defined by general Formula I, have hitherto not been described.

The known products defined by Formula A possess no technically valuable properties and, therefore, do not come into consideration for practical use.

It has been further found in accordance with the present invention that the particular new esters of general Formula I can be obtained in a smooth and uniformly proceeding reaction by the process which comprises reacting ester halides of the general formula:

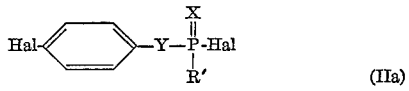
(IIa)

with amidines of the general formula:

(IIb)

The course of the reaction is illustrated by the following equation:

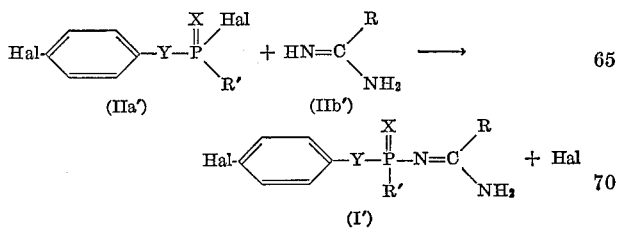

In this equation, the symbols R, R', X, Y and Hal are the same as defined above.

The phosphorus compounds of general Formula IIa required as starting materials herein are, to the greater part, described in the literature and can be prepared according to known methods, for example, by the partial esterification of the corresponding alkyl - (thio) - phosphoric (-phosphonic) acid (di) halides with halo-(thio)-phenols, as the case may be, or by the reaction of halophenyl-(thio)-phosphoric acid ester dihalides, as the case may be, with alcohols.

The reaction is preferably carried out in the presence of solvents of diluents. Examples of solvents include inert organic solvents, such as optionally chlorinated aliphatic or aromatic hydrocarbons, such as benzine, methylene chloride, tri- and tetrachloroethane, chloroform, carbon tetrachloride, benzene, toluene, xylene and chlorobenzene, as well as ethers, such as diethyl ether, dibutyl ether, dioxan and tetrahydrofuran, and esters, such as ethyl acetate and acetoacetic ester.

Because amidinium salts are very sparingly soluble in organic solvents, the concurrent use of water as solvent is recommended when the salts are used instead of the free amidines. The phosphorus compounds of general Formula IIa are all insoluble in water or are decomposed by it; for them, therefore, it is only possible to use organic solvents.

Furthermore, the process is expediently carried out in the presence of an acid acceptor in order to bind the hydrogen halide formed as by-product in the reaction. For this purpose, alkali metal hydroxides and carbonates have proved to be especially useful, as well as tertiary organic bases, such as triethylamine, diethylaniline or pyridine.

The reaction can be carried out within a fairly wide temperature range. In general, the operation is carried out substantially between about $-50$ and $+100°$ C., preferably at $-20$ to $+60°$ C. However, since the reaction initially proceeds more or less exothermally, gentle external cooling of the mixture its often necessary or at least advantageous in order to keep its temperature within the given range.

When carrying out the reaction, stoichiometrical amounts of the two starting components, as well as of the adjuvants, are generally used, i.e. 1 mol of amidine and 1 to 2 mol acid-binding agent per mol of phosphorus compound, and as already mentioned above, the amidines can be used not only as free bases but also in the form of their salts. In the latter case, however, care must be taken, by the addition of an appropriate amount of acid-binding agent, that the amidine in question is liberated during the reaction.

It is possible to carry out the reaction not only in the homogeneous phase but also in the heterogeneous phase. If the reaction is carried out in suspension, the reaction mixture should be stirred intensely. Furthermore, it has proved to be expedient, after combination of the starting components, to continue stirring of the mixture for some time, (e. g. 0.5 to 3 hours), possibly with gentle heating, to complete the reaction.

Working up of the reaction mixture takes place in the known manner. When working in organic solvents, the solvent is removed from the filtrate by evaporation, preferably in a vacuum, after filtering off the hydrohalic acid salts obtained as by-product. The reaction product remaining as residue can subsequently be further purified by recrystallization. If water is concurrently used as solvent, however, it is, in general, sufficient to separate the organic phase, to dry it and to evaporate it under reduced pressure.

The particular new compounds according to the present invention are mostly initially obtained in the form of colorless or pale yellow to yellow-brown colored oils, most of which, however, solidify in crystalline form when cooled or when left to stand for a time.

In contradistinction to the previously known, constitutionally analogous esters of Formula A, which possess no action of this type, the particular new compounds of the present invention are characterized by outstanding pesticidal, and specifically rodenticidal, properties and are, therefore, eminently suitable for use against gnawing pests of the most varied kind. In this connection, they can be used typically, not only for combating leporines (Lagomorpha), but also rodents (Rodentia), such as sciurines (Sciuroidae), gophers (Geomyoidae) and animals of the mouse type (Muroidae), including essentially animals of the dormouse type (Muscardinidae) and mice (Muridae); and the like.

As contemplated herein, the leporines essentially include the Leporidae, such as the rabbit (*Oryctolagus cuniculus*); the sciurines include e.g. the European souslik (*Citellus citellus*) and the ground squirrel (*Citellus lateralis*), and the gophers include, for example, the mountain pocket gopher (*Thomomys talpoides*); and the like.

To the animals of the dormouse type belong, for example, the fat dormouse (*Glis glis*).

The mice include, above all, in the long-tailed mice group (Murinae), the rats (*Rattus spec.*), such as the roof rat (*Rattus rattus*) and the Norway rat (*Rattus norvegicus*); the house mice (*Mus spec.*), such as *Mus musculus*; in the hamster type group (Cricetinae) there is included the European hamster (*Cricetus cricetus*); and among the short-tailed mice (Microtinae), for example, the common mole (*Microtus arvalis*), the field mole (*Microtus agrestis*) and the water mole (*Arvicola terrestria*); and the like.

All of the foregoing types of creatures are broadly contemplated herein and especially in the claims in connection with the scope and import of the term "rodenticide." Thus, not only common rodents but also animals of the gnawing type generally are to be considered as falling within the purview of the term rodenticide, and more particularly the term rodent.

Thus, the new compounds of the instant invention can be used as rodenticides, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use; even animal and vegetable origin baits, e.g. corn, meat or fish meals.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.05 and 20% by weight of the mixture. Thus, the present invention contemplates overall compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.05 and 95% by weight of the mixture.

Furthermore, the present invention contemplates methods of selectively controlling and combating rodents, which comprise applying to at least one of (a) such rodents and (b) their habitat, a rodenticidally effective amount of the particular compound of the invention alone or together with a carrier vehicle as noted above. The instant formulations or compositions are applied in the usual manner, for example, by spraying, atomizing, vaporizing, scattering, dusting, watering, sprinkling, pouring, and the like, and especially by way of poisoning of drinking water, scattering in the form of powders, laying food or playing baits, above or under the ground, into which the active substances of the invention have been incorporated, as well as fumigating rooms or underground habitats of such rodents.

The outstanding rodenticidal effectiveness of the particular new compounds according to the present invention can be seen from the following experimental results which are set forth by way of illustration and not limitation:

EXAMPLE 1

Acute toxicity test/peroral

Test animal: White laboratory mouse (*Mus musculus*).—To produce a suitable preparation of the particular active compound, 3 parts by weight of such active compound are mixed with 2.8 parts by weight of highly-dispersed silicic acid and 4.2 parts by weight of talc. From this active material concentrate there are produced suspensions by trituration with water, with the addition of some powdered vegetable gum, these suspensions containing in 1 ml. liquid, the amount of the given active compound to be used per 100 g. of animal weight. Application takes place volumetrically, after weighing the experimental animals, application being per os by means of a steel probe. The experimental evaluations are made after 3 days.

The determination of the $LD_{50}$ values (dosage of active compound by which 50% of the treated animals are destroyed) is made in the usual way from the mortality values of the dosages varied in geometrical progression.

For combating leporines and rodents, substances are considered suitable, the $LD_{50}$ of which lies at or below 75 mg. per kg. of body weight.

The tested active compounds and the $LD_{50}$ values determined (in mg./kg. body weight) can be seen from the following table:

TABLE I.—ACUTE TOXICITY TEST/PERORAL

| Active compound (constitution) | | $LD_{50}$ mouse per os (mg./kg.) |
|---|---|---|
| Cl–C$_6$H$_4$–O–P(=O)(OCH$_3$)–N=C(H)(NH$_2$) | (III) | 40 |
| Cl–C$_6$H$_4$–O–P(=O)(OCH$_3$)–N=C(CH$_3$)(NH$_2$) | (IV) | 3 |
| Cl–C$_6$H$_4$–O–P(=S)(OC$_2$H$_5$)–N=C(H)(NH$_2$) | (V) | 58 |
| Br–C$_6$H$_4$–O–P(=S)(OC$_2$H$_5$)–N=C(H)(NH$_2$) | (VI) | 60 |
| Cl–C$_6$H$_4$–O–P(=S)(O-iso-C$_3$H$_7$)–N=C(H)(NH$_2$) | (VII) | 75 |
| Br–C$_6$H$_4$–O–P(=S)(CH$_3$)–N=C(H)(NH$_2$) | (VIII) | 3.75 |
| Cl–C$_6$H$_4$–O–P(=S)(C$_2$H$_5$)–N=C(H)(NH$_2$) | (IX) | 5 |
| Cl–C$_6$H$_4$–O–P(=S)(OCH$_3$)–N=C(CH$_3$)(NH$_2$) | (X) | 2.5 |
| Cl–C$_6$H$_4$–O–P(=S)(O-iso-C$_3$H$_7$)–N=C(CH$_3$)(NH$_2$) | (XI) | 60 |
| Br–C$_6$H$_4$–O–P(=S)(OCH$_3$)–N=C(CH$_3$)(NH$_2$) | (XII) | 2 |
| Br–C$_6$H$_4$–O–P(=S)(OCH$_3$)–N=C(C$_2$H$_5$)(NH$_2$) | (XIII) | 20 |
| Br–C$_6$H$_4$–O–P(=S)(CH$_3$)–N=C(CH$_3$)(NH$_2$) | (XIV) | 5 |
| Cl–C$_6$H$_4$–O–P(=S)(C$_2$H$_5$)–N=C(CH$_3$)(NH$_2$) | (XV) | 7.5 |
| Cl–C$_6$H$_4$–S–P(=S)(C$_2$H$_5$)–N=C(CH$_3$)(NH$_2$) | (XVI) | 37.5 |
| Br–C$_6$H$_4$–O–P(=S)(CH$_3$)–N=C(C$_2$H$_5$)(NH$_2$) | (XVII) | 7.5 |

The following examples are given for the purpose of illustrating, while not limiting, the production of the particular new compounds according to the present invention.

EXAMPLE 2

(VIII')
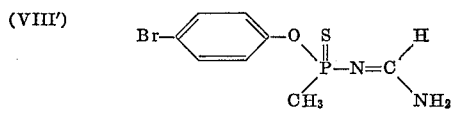

An approximately 50% alcoholic solution of 0.11 to 0.13 mol of formamidinium chloride is diluted with 25 ml. of water and 0.1 mol of methyl thionophosphonic acid-O-(4-bromophenyl)-ester chloride, dissolved in 250 ml. of methylene chloride, and 0.2 mol of sodium hydroxide in 50 ml. of water is added dropwise to this solution from two separate dropping funnels, with vigorous stirring, in such a manner that no excess of sodium hydroxide solution over the acid chloride arises in the reaction mixture. The reaction, which proceeds weakly exothermally, is moderated by occasional external cooling of the mixture with water to such an extent that its temperature does not exceed 25 to 30° C. The reaction mixture is subsequently further stirred for about 1 hour at 40 to 45° C. The organic phase is then separated, dried over anhydrous sodium sulfate and the solvent evaporated off under reduced pressure. As residue, there remain 28 g. (91% of theory) of the compound N-(amino-methylene)-imido-methyl-thionophosphonic acid-O-4(bromophenyl) ester of the above formula in the form of a viscous oil which gradually solidifies in crystalline form. After recrystallization from a methanol/water mixture, the colorless crystals melt at 100 to 102° C.

*Analysis.*—Calculated (percent) for $C_8H_{10}ON_2PSBr$: C, 32.8; H, 3.4; N, 9.6; P, 10.6; S, 10.9. Found: (percent) C, 33.05; H, 3.54; N, 9.55; P, 9.95; S, 10.35.

EXAMPLE 3

(IX')
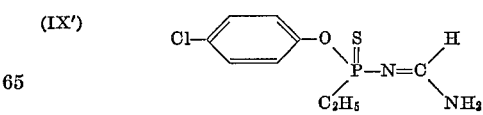

By reacting formamidinium chloride in an aqueous alcoholic solution with a solution of ethyl-thionophosphonic acid-O-(4-chlorophenyl) ester chloride as described in Example 2, the above depicted compound N-(aminomethylene) - imido - ethyl - thionophosphonic acid - O-(4-chlorophenyl) ester is obtained in the form of colorless crystals which, after recrystallization from benzene,

EXAMPLE 4

(XII') 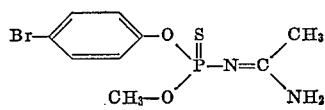

To a solution of somewhat more than 0.1 mol of acetamidinium chloride in 50 ml. of water, there is simultaneously added dropwise from 2 dropping funnels, while stirring, as described in Example 2, 0.1 mol of O-methyl-thionophosphoric acid-O-(4-bromophenyl) ester chloride in 200 ml. of ether and a solution of 8 g. of sodium hydroxide in 25 ml. of water, the temperature of the reaction mixture being kept at 20 to 35° C. The mixture is subsequently stirred for a further 30 minutes at 40 to 45° C. The organic phase is then separated, dried over anhydrous sodium sulfate and the solvent evaporated off under reduced pressure. As residue there are obtained about 27 to 30 g. of a pale yellow oil which solidifies in crystalline form upon standing. After recrystallization from benzene, the compound N-(1-amino-ethylidene)-imido - thionophosphoric acid - O - methyl - O - (4-bromophenyl) ester of the above constitution is obtained in the form of colorless crystals melting at 73 to 75° C.

*Analysis.*—Calculated (percent) for $C_9H_{12}O_2N_2PSBr$: C, 33.5; H, 3.7; P, 9.6; S, 9.9. Found: (percent) C, 34.0; H, 3.7; P, 9.0; S, 9.3.

EXAMPLE 5

(IV') 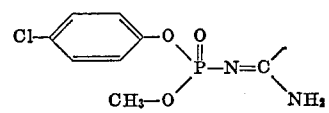

When acetamidinium chloride is reacted in a corresponding manner to that of Example 2 with an equimolar amount of O-methyl-phosphoric acid-O-(4-chlorophenyl) ester chloride, then the above compound N-(1-amino-ethylidene) - imido - phosphoric acid - O - methyl - O - (4-chlorophenyl) ester is obtained in the form of a pale yellow viscous oil.

*Analysis.*—Calculated (percent) for $C_9H_{12}O_3N_2PCl$: C, 41.2; H, 4.6; N, 10.6; P, 11.8; Cl, 13.5. Found: (percent) C, 41.5; H, 4.7; N, 10.5; P, 12.2; Cl, 14.0.

EXAMPLE 6

(XV') 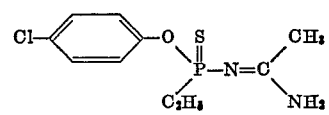

In a manner analogous to that described in Example 2, 0.1 mol of ethyl-thionophosphonic acid-O-(4-chlorophenyl) ester chloride, dissolved in 250 ml. of methylene chloride, and a solution of 0.2 mol of sodium hydroxide in 50 ml. of water are added dropwise with vigorous stirring to an aqueous solution of 0.12 mol of acetamidinium chloride. At the end of the weakly exothermal reaction, the mixture is further stirred for about half an hour at 40 to 45° C., then worked up in the manner described in Example 2. About 26 g. of the compound N-(1-amino-ethylidene)-imido-ethyl-thionophosphonic acid - O - (4-chlorophenyl) ester of the above formula are thus obtained in the form of a viscous oil which gradually crystallizes upon standing. After pressing on clay, the crystals melt at 50 to 52° C.

EXAMPLE 7

(XIV') 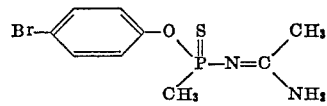

By reacting methyl thionophosphonic acid-O-(4-bromophenyl) ester chloride in the same manner as described in Example 2, the above compound N-(1-amino-ethylidene)-imido-methyl-thionophosphonic acid-O-(4-bromophenyl) ester is obtained in the form of a pale yellow oil which crystallizes upon trituration with white spirit. After pressing on clay, the crystals melt at 90 to 92° C.

*Analysis.*—Calculated (percent) for $C_9H_{12}ON_2PSBr$: C, 35.2; H, 3.9; N, 9.1; P, 10.1; S, 10.4; Br, 26.0. Found: (percent) C, 35.1; H, 3.9; N, 8.7; P, 10.0; S, 10.5; Br, 26.6.

EXAMPLE 8

(XVI') 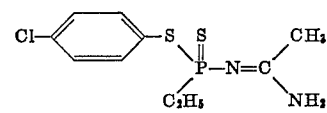

To an aqueous solution of 0.12 mol of acetamidinium chloride, there are simultaneously added dropwise, with intensive stirring, from two dropping funnels, as in Example 2, (a) 0.1 mol of ethyl thionothiolphosphonic acid-S-(4-chlorophenyl) ester chloride, dissolved in 200 ml. of methylene chloride, and (b) a solution of 8 g. of sodium hydroxide in 25 ml. of water. The reaction mixture is subsequently worked up in the manner described in Example 2. After evaporation of the organic phase, there is obtained, as residue, a colorless oil which, upon standing, solidifies in crystalline form. After recrystallization from benzene, the crystals melt at 77° C. The product is N-(1 - amino - ethylidene)-imido-ethyl-thionothiol-phosphonic acid-S-(4-chlorophenyl)ester, which has the foregoing formula.

*Analysis.*—Calculated (percent) for $C_{10}H_{14}N_2PS_2Cl$: C, 41.1; H, 4.8; N, 9.6; S, 21.9; P, 10.6; Cl, 12.3. Found: (percent) C, 40.84; H, 5.20; N, 9.66; S, 21.78; P, 10.35; Cl, 12.20.

EXAMPLE 9

(XVII') 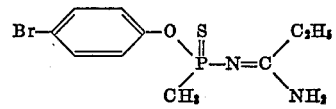

Methyl thionophosphonic acid - O - (4-bromophenyl) ester chloride is reacted with propionyl-amidinium chloride in the manner described in Example 2. As reaction product, there is obtained a viscous, colorless oil which, upon standing, solidifies in crystalline form. After recrystallization from a methanol/water mixture, the colorless crystals melt at 72° C. The product is N-(1-amino-propylidene)-imido-methyl-thionophosphonic acid-O-(4-bromophenyl) ester, which has the foregoing formula.

*Analysis.*—Calculated (percent) for $C_{10}H_{14}ON_2PSBr$: N, 8.7; P, 9.7; S, 9.97; Br, 24.9. Found (percent) N, 8.43; P, 9.4; S, 9.90; Br, 24.65.

EXAMPLE 10

In a manner analogous to that described in the previous examples, using corresponding molar amounts of the appropriate starting materials, the following compounds can also be prepared:

| Constitution | Physical Properties | Empirical Formula | Analysis |
|---|---|---|---|
| (XVIII) Cl—⟨phenyl⟩—O—P(=S)(OC$_2$H$_5$)—N=C(CH$_3$)(NH$_2$) | Colorless oil | C$_{10}$H$_{14}$O$_2$NPSCl | Calc.: P, 10.6%; S, 10.9%; Cl, 12.1%.<br>Found: P, 10.3%; S, 10.7%; Cl, 12.6%. |
| N—(1-amino-ethylidene)-imido-thionophosphoric acid-O-ethyl-O-(4-chlorophenyl) ester | | | |
| (XI′) Cl—⟨phenyl⟩—O—P(=S)(O-iso-C$_3$H$_7$)—N=C(CH$_3$)(NH$_2$) | Colorless oil | C$_{11}$H$_{16}$O$_2$N$_2$PSCl | Calc.: P, 10.1%; S, 10.4%; N, 9.1%.<br>Found: P, 9.6%; S, 10.3%; N, 8.6%. |
| N-(1-amino-ethylidene)-imido-thionophosphoric acid-O-isopropyl-O-(4-chlorophenyl) ester | | | |
| (XIX) Cl—⟨phenyl⟩—O—P(=S)(O-n-C$_4$H$_9$)—N=C(CH$_3$)(NH$_2$) | Colorless oil | C$_{12}$H$_{18}$O$_2$N$_2$PSCl | Calc.: P, 9.7%; S, 10.0%; Cl, 11.1%.<br>Found: P, 9.4%; S, 9.6%; Cl, 11.6%. |
| N-(1-amino-ethylidene)-imido-thionophosphoric acid-O-n-butyl-O-(4-chlorophenyl) ester | | | |

EXAMPLE 11

In the same way, using corresponding molar amounts of the following starting materials:

(a) Isopropionylamidinium chloride and sec.-butyl-phosphonic acid-O-(4-chlorophenyl) ester chloride;

(b) Tert.-butyryl-amidinium chloride and n-propyl-thiolphosphonic acid-S-(4-bromophenyl) ester chloride;

(c) Formamidinium chloride and O-n-butyl-thiolphosphoric acid-S-(4-chlorophenyl) ester chloride;

(d) N-n-propionylamidinium chloride and O-methyl-thionothiolphosphoric acid-S-(4-bromophenyl) ester chloride;

the respective final products are obtained:

(a′) N - (1 - amino isopropylidene) - imido - sec. - butyl-phosphonic acid-O-(4-chlorophenyl)ester;

(b′) N - (1 - amino - 2,2 - dimethyl - propylidene)-imido-n-propyl-thiolphosphonic acid-S-(4-bromophenyl)-ester;

(c′) N - (1 - amino - methylene) - imido - thiolphosphoric acid-O-n-butyl-S-(4-chlorophenyl)ester;

(d′) N - (1 - amino - n - propylidene) - imido - thionothiolphosphoric acid-O-methyl-S-(4-bromophenyl) ester.

Thus, in accordance with the present invention, the following types of esters are contemplated over-all as rodenticides herein:

(i) N - (1 - amino alkylidene) - imido - phosphoric acid-O-alkyl-O-(4-halophenyl)ester;

(ii) N - (1 - amino alkylidene) - imido - alkyl - phosphonic acid-O-(4-halophenyl) ester;

(iii) N - (1 - amino alkylidene) - imido - thiolphosphoric acid-O-alkyl-S-(4-halophenyl) ester;

(iv) N - (1 - amino alkylidene) - imido - alkyl - thiolphosphonic acid-S-(4-halophenyl) ester;

(v) N - (1 - amino alkylidene) - imido - thionophosphoric acid-O-alkyl-O-(4-halophenyl) ester;

(vi) N - (1 - amino alkylidene) - imido - alkyl - thionophosphonic acid-O-(4-halophenyl) ester;

(vii) N - (1 - amino alkylidene) - imido -thionothiolphosphoric acid-O-alkyl-S-(4-halophenyl) ester;

(viii) N - (1 - amino alkylidene) - imido - thionothiolalkyl-phosphonic acid-S-(4-halophenyl) ester.

Advantageously, in accordance with the present invention, in the foregoing formulae:

R represents hydrogen or lower alkyl such as methyl, ethyl, n-propyl, isopropyl, n-butyl, isobutyl, sec.-butyl, tert.-butyl, and the like, especially alkyl having 1–4 carbon atoms;

R′ represents lower alkyl, such as methyl to tert.-butyl, inclusive, etc., as enumerated under R above, especially alkyl having 1–4 carbon atoms; or lower alkoxy, such as methoxy, ethoxy, n-propoxy, isopropoxy, n-butoxy, isobutoxy, sec.-butoxy, tert.-butoxy, and the like, especially alkoxy having 1–4 carbon atoms;

X and Y, each respectively, represents oxygen or sulfur, in the case of X preferably sulfur and in the case of Y preferably oxygen; and Hal represents halogen, such as chloro, bromo, fluoro, or iodo, preferably chloro or bromo.

In accordance with a preferred embodiment of the present invention, R is hydrogen or methyl; R′ is lower alkyl or lower alkoxy in which the corresponding radical is methyl, ethyl, n-propyl, isopropyl, n-butyl, sec.-butyl, methoxy, ethoxy, n-propoxy, isopropoxy, n-butoxy, or sec.-butoxy; X is sulfur, Y is oxygen and Hal is chloro or bromo.

All of the foregoing compounds in accordance with the present invention possess the desired strong rodenticidal properties, whereby rodents within the broad contemplation of such term as noted above may be controlled, combated and/or eliminated by application of the instant compounds to such rodents and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phosphorus-containing ester having the formula

Hal—⟨phenyl⟩—Y—P(=X)(R′)—N=C(R)(NH$_2$)

in which R represents a member selected from the group consisting of hydrogen and lower alkyl, R′ represents a member selected from the group consisting of lower alkyl and lower alkoxy, X and Y each respectively represents a member selected from the group consisting of oxygen and sulfur, and Hal represents a halo atom.

2. Ester according to claim 1 wherein R is selected from the group consisting of hydrogen and lower alkyl having 1–4 carbon atoms, R′ is selected from the group consisting of lower alkyl having 1–4 carbon atoms and lower alkoxy having 1–4 carbon atoms, and Hal is selected from the group consisting of chloro and bromo, and X is sulfur and Y is oxygen.

3. The compound N-(1-amino-ethylidene)-imido-phosphoric acid-O-methyl-O-(4-chlorophenyl) ester having the formula

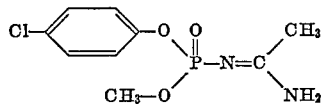

4. The compound N-(amino-methylene)-imido-methyl-thionophosphonic acid-O-(4-bromophenyl)ester having the formula

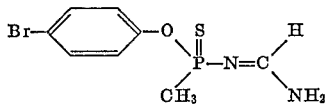

5. The compound N-(amino-methylene)-imido-ethyl-thionophosphonic acid-O-(4-chlorophenyl) ester having the formula

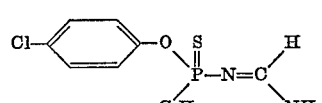

6. The compound N-(1-amino-ethylidene)-imido-thionophosphoric acid-O-methyl-O-(4-chlorophenyl) ester having the formula

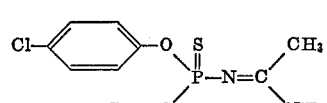

7. The compound N-(1-amino-ethylidene)-imido-thionophosphoric acid-O-methyl-O-(4-bromophenyl) ester having the formula

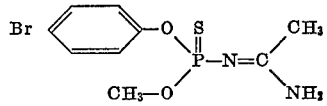

8. The compound N-(1-amino-ethylidene)-imido-methyl-thionophosphonic acid-O-(4-bromophenyl) ester having the formula

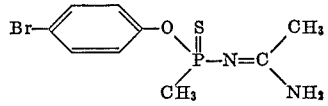

9. The compound N-(1-amino-ethylidene)-imido-ethyl-thionothiolphosphonic acid-S-(4-chlorophenyl) ester having the formula

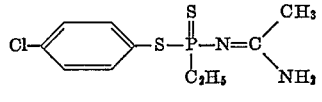

References Cited

UNITED STATES PATENTS 3,281,321   10/1966   Malz et al. _____ 260—944

CHARLES B. PARKER, *Primary Examiner.*

A. H. SUTTO, *Assistant Examiner.*

U.S. Cl. X.R.

260—984; 424—211

| PO-1050 (5/69) | UNITED STATES PATENT OFFICE |
|---|---|

CERTIFICATE OF CORRECTION

Patent No. 3,454,681                    Dated July 8, 1969

Inventor(s) Hugo Malz and Günther Hermann

It is certified that error appears in the above-identified patent and that said Letters Patent are hereby corrected as shown below:

Column 2, line 40, "its" should read --is--. Column 3, line 34, "mole" should read --vole--. Column 3, line 35, "mole" should read --vole--. Column 7, line 35, the formula should read as follows:

(IV')  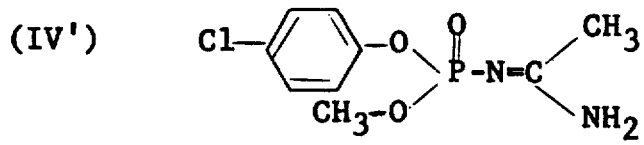

SIGNED AND SEALED

DEC 23 1969

(SEAL)
Attest:

Edward M. Fletcher, Jr.
Attesting Officer

WILLIAM E. SCHUYLER, JR.
Commissioner of Patents